April 19, 1927.

E. O. SPILLMAN 1,624,992

INTERNAL COMBUSTION ENGINE

Filed Aug. 19, 1924

INVENTOR
Edward O. Spillman
BY
his ATTORNEY

April 19, 1927.  E. O. SPILLMAN  1,624,992
INTERNAL COMBUSTION ENGINE
Filed Aug. 19, 1924  2 Sheets-Sheet 2
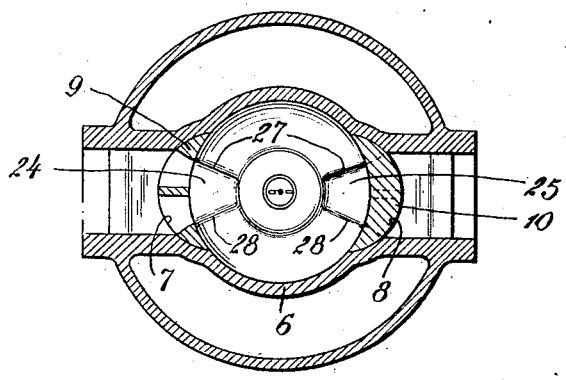
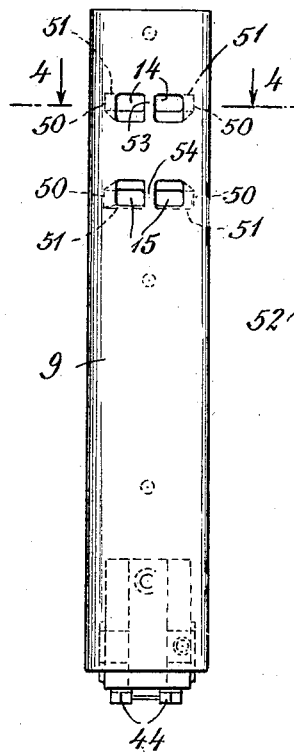
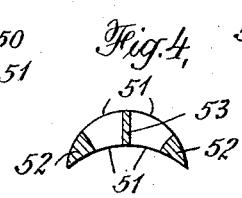
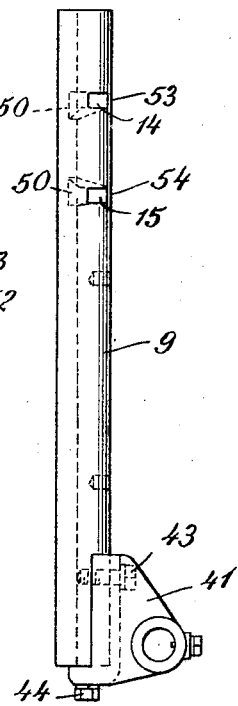
INVENTOR
Edward O. Spillman
BY
Pennie, Davis, Marvin & Edmonds
his ATTORNEYS Patented Apr. 19, 1927.

1,624,992

UNITED STATES PATENT OFFICE.

EDWARD O. SPILLMAN, OF NORTH TONAWANDA, NEW YORK, ASSIGNOR TO FISCHER MOTOR COMPANY, OF NEW YORK, N. Y., A NEW YORK TRUST ESTATE.

INTERNAL-COMBUSTION ENGINE.

Application filed August 19, 1924. Serial No. 732,914.

This invention relates to internal combustion engines and particularly to internal combustion engines of the sliding valve type and has for its object the provision of an improved engine structure.

More especially, the invention relates to internal combustion engines such as shown in Patent 1,103,901, dated July 14, 1914, and Patent #1,129,461, dated February 23, 1915, both of said patents being granted to Martin Fischer. In these prior patents there are disclosed engines in which the valve members slide in suitable recesses in the cylinder walls, one valve member controlling the inlet port and another valve member controlling the outlet or exhaust port. In the first of these patents the valve member is crescent shaped in cross section, while in the second patent the rear surfaces of the valve member are flat, the valve member, however, being substantially of crescent shape.

The internal combustion engines described in these prior patents are operative and successful but my recent investigations have resulted in the development of improvements in the construction of this type of engine which secure better and more economical performance. Among other things the present invention affords a material reduction in the magnitude of the forces resulting from the inertia of the moving parts of the valve mechanism, a more complete filling of the cylinder with the charge of gaseous fuel which is to be burned, a more thorough mixing of the constituents of the gaseous fuel and a more rapid spread of the flame upon ignition, which results in a more complete and effective burning of the fuel charge. In an engine of the type contemplated by this invention, it is of importance that the various parts be so arranged that the inertia forces are as low as possible, these forces having their greatest effect in the valve mechanism which includes a relatively heavy bar of metal extending the entire length of the cylinder and which must be reciprocated at one-half the speed of the engine piston in order properly to control the opening and closing of the valves. The inertia forces produced in this mechanism depend directly upon the weight or mass of the moving parts and also upon the square of the velocity with which they move. It is therefore important that the weight of the valve member and its connected parts be reduced as much as possible and at the same time provide valve openings of an area which will allow the gasess to enter and leave the cylinder with relatively little resistance. Furthermore, inasmuch as the inertia forces vary as the square of the velocity of the moving parts, it is important to reduce to a relatively low value the maximum velocity with which the sliding members move.

It is of further importance, in order to secure greater thermal efficiency, that the constituents of the gaseous fuel mixture be thoroughly mixed and vaporized within the cylinder prior to ignition and when the proper time for ignition arrives, that the flame spread to all parts of the compressed gases with extreme rapidity so as to produce instantaneous, thorough and complete burning of the charge. One of the essentials for obtaining this instantaneous burning of the charge is that the shape of the combustion chamber be substantially symmetrical.

According to the present invention, substantially crescent shaped valve members are arranged to slide in recesses in the walls of the cylinder to control the inlet and exhaust ports, and each of the valve members is provided with two or more longitudinally spaced ports adapted to control corresponding cylinder ports located in the recesses in which the valve members slide. In this way, the weight of the valve member is not materially increased but relatively large port openings are secured, particularly when the port openings are cut in the manner of the invention to be later described. The spacing of these multiple ports longitudinally of the valve member and therefore of the cylinder, tends, however, to interfere with the symmetrical and uniform shape of the combustion chamber. Consequently, I provide a cylinder head having a portion projecting within the cylinder which is of substantially inverted cup shape and is provided with a channel for each of the upper valve ports having downwardly curving and inwardly converging walls. The spark plug is preferably located centrally of this projecting portion so that the sparking points of the plug extend a relatively short distance into the apex of the inverted cup shaped chamber, and directly opposite the end of the converging channel from the upper intake port.

The walls of the two longitudinally spaced ports in the intake valve member are preferably formed so as to cause the two streams of incoming gaseous fuel to be directed toward one another When these two streams meet they produce a turbulent movement of the gases which results in a particularly effective inter-mixing of the constituents of the fuel charge and causes it to continue in more or less violent motion throughout all parts of the cylinder during the intake stroke, which reduces the tendency to the formation of a film of relatively cool gases upon the walls of the cylinder. Moreover, these two streams of incoming gases are preferably arranged to meet in the immediate vicinity of the sparking points of the spark plug so as to insure a thorough mixing of the gases at this point and so as to exert a cleansing action upon the sparking points.

The downwardly curved wall of the converging channel from the upper inlet port directs the stream of incoming gases from this port at an extremely wide angle with respect to the incoming gases from the lower port so that an effective turbulent movement of the gases is secured, and also tending to direct the gases toward the central portion of the lower part of the cylinder. As a result of this arrangement of the valve ports and the combustion chamber walls, an extremely rapid and uniform spreading of the flame to all portions of the ignited charge is secured.

Another feature of the invention resides in the manner of cutting the ports in the crescent shaped slide valve member, these ports being so cut as to leave marginal portions of the valve member on each side of the ports having sectional outlines substantially in the form of isosceles triangles the substantially equal legs of which are formed by the inner and outer curved surfaces of the valve member. By cutting the ports in this way a comparatively large amount of material is left between the boundaries of the ports and the edges of the valve member. Thus, a ported crescent shaped valve member is made which will withstand the stresses to which it is subjected without breaking, and which at the same time is extremely light in weight, thus reducing the inertia stresses upon all parts of the valve mechanism. Preferably the longitudinally spaced ports are each subdivided by a longitudinal partition integral with the valve member which adds to the strength of the valve at this point and increases the turbulent movement of the incoming gases.

The reciprocating motion is imparted to the slide valve member, according to the present invention, by means of a crank which is arranged to both open and close the valve while the crank is near one end of its stroke. The combination of the ported crescent shaped valve member, particularly when the ports are cut according to the manner of the invention just mentioned, with the crank arranged to both open and close the valve while the crank is near one end of its stroke, materially improves the operation of the engine. The admission and exhaust are accomplished with reduced losses and the operation is remarkably smooth and noiseless.

A further feature of the invention is found in the means used for operatively connecting the crescent shaped slide valve member with the actuating crank. The valve member is provided at one end with a bracket, to which the connecting rod is pivoted, having a foot cooperating with the lower end of the valve member This bracket is adjustable longitudinally of the valve member in a way which provides ready and positive means for permanently adjusting the valve to secure proper setting.

The invention will be better understood by referring to the following description taken in connection with the accompanying drawings which illustrate by way of example the preferred embodiment of my invention. In these drawings:

Fig. 1 is a view in longitudinal section of an internal combustion engine constructed in accordance with my invention.

Fig. 2 is a view in transverse section taken on line 2—2 of Fig. 1.

Fig. 3 is a view in front elevation of a crescent-shaped slide valve member.

Fig. 4 is a view in transverse section taken on line 4—4 of Fig. 3.

Fig. 5 is a view in side elevation of the valve member shown in Figs. 3 and 4.

Referring to these drawings the engine comprises a cylinder casting 1, which is mounted upon the upper part of a crank case 2. A piston 3 reciprocates within the cylinder to drive the crank 4 through the connecting rod 5. The inner wall 6 of the cylinder is provided with two oppositely placed longitudinal recesses or grooves 7 and 8, the side walls of which, as will be seen from Fig. 2, diverge inwardly to meet the inner wall of the cylinder. In these recesses, the inlet valve 9 and the outlet valve 10 are adapted to slide longitudinally.

The structure of these crescent shaped valve members is shown clearly in Figs. 3, 4 and 5. The two valve members are identical, one with the other, and are held in place in their recesses 7 and 8 respectively by means of the piston 3. They thus slide in contact with the piston.

The engine is provided at the left, as viewed in Fig. 1, with an intake manifold 11, which is properly secured to the cylinder casting 1, in such a manner as to supply a gaseous fuel to a pair of communicating inlet ports 12 and 13 respectively which are cored through the walls of the cylinder casting into the bottom of recess 7 near the upper end thereof. The inlet valve 9 has ports 14 and 15 corresponding to ports 12 and 13, the walls of ports 14 and 15 being formed so as to direct the two streams of incoming gases toward one another.

The exhaust valve 10 is furnished with a pair of ports 16 and 17, which are adapted to control corresponding ports 18 and 19 that are cored through the wall of the cylinder casting 1, and communicate with the exhaust manifold 20. The inlet valve 9 is shown in the open position and the outlet valve 10 in the closed position, the piston being in a position approaching the end of the intake stroke.

A cylinder head 21 is bolted to the top of the cylinder casting 1 in any appropriate manner and has a longitudinal projection 22 entering the top of the cylinder, the bottom of this projection extending to a point just above the lower valve ports 15 and 19. The inner end 23 of this projection is of substantially inverted shallow cup shape. A pair of channels 24 and 25 (Figs. 1 and 2) are cast in this inner surface and have downwardly curving top walls 26. The side walls 27 and 28 of these channels shown in Fig. 2 converge toward the apex of the inverted cup shaped bottom wall 23. At this point the sparking points of the spark plug 29 extend a relatively short distance into the compression chamber.

Water cooling passages are properly positioned around the sides of the cylinder casting and within the projection 22 of the cylinder head. The tapped holes 30 in the valve members 9 and 10, together with their corresponding plugged holes 31 in the cylinder casting are for the purpose of securing the valve members in position during the simultaneous machining of the cylinder walls and of the concave surfaces of the valve members.

The valve actuating cranks 32 and 33 rotate upon suitable shafts within the crank case 2 and are driven by gears 34 and 35 respectively, which mesh with pinion 36, mounted on the main shaft of the engine. The valve actuating crank shafts make 2 revolutions for one revolution of the main shaft so as to properly actuate the valves according too the four stroke cycle principle. Cranks 32 and 33 are provided respectively with connecting rods 37 and 38 which are pivoted at 39 and 40 respectively to brackets 41 and 42, mounted at the lower ends of valve members 9 and 10.

These brackets are attached to the ends of the valve members by means of bolts 43 and 44. Bolts 43 are tapped into the side of the valve members and pass through slotted openings 45 in the brackets. Bolts 44 pass through the feet 46 of the brackets, which extend across the lower end faces of the valve members 9 and 10 and are tapped into the ends of the valve members.

It is desirable to provide for an adjustment of the valve members with respect to their actuating cranks so that the valve ports may be made to properly cooperate with the cylinder ports in order to control the inlet and exhaust valve openings. In order to secure this setting of the valves the bolts 43 and 44 may be loosened and shims placed between the feet 46 and the ends of the valve members, the slotted openings 45 allowing for a sufficient adjustment of this kind. The provision of the feet 46 extending across the lower ends of the valves so that the holding bolts 43 and 44 are tapped into the valve members at right angles to one another, and also providing for the introduction of the shims, insures a positive mounting of the brackets so that when the valves have once been set there is no danger of a shifting of their adjustment.

The valve members 9 and 10 which are reciprocated up and down in the recesses 7 and 8, by the mechanism just described, slide in contact with the surfaces of the recesses and with the surface of the piston, and at their upper ends they are guided by rings 47 which are carried on the projection 22 of the cylinder head. These rings serve to hold the valve members outwardly in contact with the recesses 7 and 8 and thus prevent any tendency of the upper ends of the valves to vibrate and produce noise. By providing these rings a cooling of the valve members is also effected. Since these rings are always in contact with the valve members and cylinder head, the cool circulating water in the cylinder head will tend to reduce the temperature of the top ends of the valve members, thus serving to cool the lower portions of the valve members also as mentioned below. The cranks 32 and 33 are so arranged that the valve member ports come into position opposite the cylinder ports at the upper ends of the strokes of the valve cranks, so that not only is a quick opening and closing of the valves obtained, which is necessary to the proper operation of the engine, but also the ports are caused to remain in relatively wide open position for a considerable period of time.

Referring again to the ports of the inlet valve member 9, the lower transverse wall 48 of port 14. and the upper transverse wall 49 of port 15 are made to slope toward one another and in this way when the gaseous fuel mixture is being drawn into the cylinder during the intake stroke of the engine, the streams of gaseous mixture passing inwardly through the ports 14 and 15 will be directed toward one another and, aided by the downward curvature of wall 25, will meet in the vicinity of the sparking points of the spark plug. Furthermore, the converging walls 27 and 28 of the cylinder head modify the relatively wide stream of gas from the upper port into a relatively narrow stream which, impinging upon the stream from the lower port 15, results in a relatively great turbulent movement of the incoming gases and directs the gases downwardly toward the central portion of the cylinder and away from the cylinder walls.

Referring now to Figs. 3, 4, and 5, showing the preferred form of crescent shaped valve member, the longitudinally extending walls 50 of ports 14 and 15 are seen to increase in length from the convex to the concave side of the valve member, and the transversely extending walls 51, on the other hand, decrease in length from the convex to the concave side of the valve member. As a result of this arrangement, the shape of each port as it passes through the valve member is modified while the cross-sectional area of the port is maintained or may even be increased. Because of the fact that the transverse walls 51 are thus caused to decrease in length from the convex to the concave side of the valve member, the marginal portions 52 (Fig. 3) of the valve member at the outer edges of the ports form isosceles triangles in sectional outline the substantially equal legs of which are formed by the inner and outer curved surfaces of the valve member.

A relatively large amount of metal is thus retained at each side of the ports 14 and 15 and, by this construction, a ported crescent shaped valve is produced which will operate without breaking and without placing undue stress in or causing undue wear of the valve operating mechanism. Also the marginal portions 52 afford paths for the conduction of heat from below the ports to the upper end of the valve member which is effectively cooled by rings 47 as above described. If, for example, the walls of the ports were taken straight through the valve member the metal at these points would be considerably reduced and in order to secure enough strength the valve member would have to be increased in width which would add to the weight of the member and thus greatly increase the inertia forces acting upon the valve member itself and the valve actuating cranks. To further increase the strength of the valve in the neighborhood of the ports 14 and 15 they are also preferably subdivided by longitudinal partitions 53 and 54 respectively.

My investigations have shown that by constructing an internal combustion engine in accordance with the principles of this invention, greatly improved results in the performance of the engine and a material reduction in maintenance cost are obtained. The provision of a crescent shaped slide valve having double longitudinally spaced ports and operated by a crank which both opens and closes the valve substantially at one end of its stroke, results in several advantages. The valve area is increased without increasing the weight of the valve, thus reducing the losses by friction in the valve passages during the intake and exhaust strokes and also reducing the stresses in the valve mechanism caused by inertia forces. The arranging of the crank so as to open and close the valve at one end of its stroke enables the valve to maintain a relatively wide opening for a relatively long period of time, and to open and close quickly.

These results are accentuated when the ports are cut so as to leave marginal portions outside of the ports having sectional outlines substantially in the form of isosceles triangles as described, inasmuch as the strength of the valve member opposite the ports is greatly increased. I have found that valves of this type thus constructed and thus actuated operate at extremely high engine speeds without breaking and the operation is smooth and comparatively quiet.

My investigations have also shown that the arrangement of the ports so as to direct the two streams of incoming gases toward each other creates a considerable turbulent motion of the gases which very effectively intermingles the constituents of the gaseous fuel mixture, thus aiding in carburetion. The turbulence produced by the confluence of the two streams is increased by the provision of the downwardly curved wall in the cylinder head. The channels 24 and 25 in the cylinder head leading from the upper ports maintain a substantially symmetrical combustion chamber and yet permit the additional ports to be employed. The downwardly curved and converging walls of the intake channel also direct the gases downwardly toward the interior of the cylinder, which action, together with the thorough mixing, reduces condensation upon the cylinder walls and insures that the fuel charge is retained in a highly combustible condition during the compression stroke so that when the ignition is initiated, the combustion spreads with great rapidity.

What I claim as new and desire to secure by Letters Patent of the United States is:

1. In an internal combustion engine, a cylinder having a longitudinal recess in the inner wall thereof, the side walls of the recess diverging inwardly to the cylinder, a substantially crescent shaped valve member adapted to slide longitudinally in said recess, and mechanism operatively connected to the valve member to reciprocate the same, said cylinder having two longitudinally spaced inlet ports for gaseous fuel near one end of the recess therein, and said substantially crescent shaped valve member having corresponding longitudinally spaced ports for controlling the cylinder ports arranged to direct their respective streams of gaseous fuel toward one another so as to produce a turbulent movement of the incoming gases.

2. In an internal combustion engine, a cylinder having a longitudinal recess in the inner wall thereof, the side walls of the recess diverging inwardly to the cylinder, a substantially crescent shaped valve member adapted to slide longitudinally in said recess, and mechanism operatively connected to the valve member to reciprocate the same, an ignition device within the cylinder, said cylinder having two longitudinally spaced inlet ports for gaseous fuel near one end of the recess therein, said substantially crescent shaped valve member having corresponding longitudinally spaced ports for controlling the cylinder ports arranged to direct their respective streams of gaseous fuel toward one another so as to meet in the vicinity of the ignition device to produce a turbulent movement of the incoming gases.

3. In an internal combustion engine, a cylinder having a longitudinal recess in the inner wall thereof, the side walls of the recess diverging inwardly to the cylinder, a substantially crescent shaped valve member adapted to slide longitudinally in said recess, and mechanism operatively connected to the valve member to reciprocate the same, said cylinder having two longitudinally spaced inlet ports for gaseous fuel near one end of the recess therein, said substantially crescent shaped valve member having corresponding longitudinally spaced ports for controlling the cylinder ports and a cylinder head having a portion projecting within the cylinder and provided with a downwardly curved wall opposite the upper port for directing the incoming gases downwardly so as to produce a turbulent movement of these gases.

4. In an internal combustion engine, a cylinder having a longitudinal recess in the inner wall thereof, the side walls of the recess diverging inwardly to the cylinder, a substantially crescent shaped valve member adapted to slide longitudinally in said recess, and mechanism operatively connected to the valve member to reciprocate the same, said cylinder having two longitudinally spaced inlet ports for gaseous fuel near one end of the recess therein, said substantially crescent shaped valve member having corresponding longitudinally spaced ports for controlling the cylinder ports arranged to direct their respective streams of gaseous fuel toward one another, and a cylinder head having a portion projecting within the cylinder and provided with a downwardly curved wall opposite the upper port, said valve member ports and said downwardly curved wall serving to direct the respective streams of gaseous fuel toward one another so as to produce a turbulent movement of the incoming gases.

5. In an internal combustion engine, a cylinder having a longitudinal recess in the inner wall thereof, the side walls of the recess diverging inwardly to the cylinder, a substantially crescent shaped valve member adapted to slide longitudinally in said recess, and mechanism operatively connected to the valve member to reciprocate the same, said cylinder having two longitudinally spaced inlet ports for gaseous fuel near one end of the recess therein, said substantially crescent shaped valve member having corresponding longitudinally spaced ports for controlling the cylinder ports arranged to direct their respective streams of gaseous fuel toward one another so as to produce a turbulent movement of the incoming gases, and a cylinder head having a portion thereof projecting within the cylinder, a spark plug located centrally of said projecting portion, and a channel in said projecting portion having downwardly curving and inwardly converging walls for modifying the stream of incoming gases from the upper port into a relatively narrow stream in proximity to the spark plug.

6. In an internal combustion engine, a cylinder having a longitudinal recess in the inner wall thereof, the side walls of the recess diverging inwardly to the cylinder, a substantially cresent shaped valve member adapted to slide longitudinally in said recess, and means for actuating said valve member, said cylinder having two longitudinally spaced ports near one end of the recess therein, and said substantially crescent shaped valve member having corresponding longitudinally spaced ports for controlling the cylinder ports, said ports being closed at their outer edges by marginal portions of said valve member having sectional outlines substantially in the form of isosceles triangles, the substantially equal legs of which are formed by the inner and outer curved surfaces of said valve member.

7. A substantially crescent shaped slide valve for an internal combustion engine having a port therein closed at its outer edges by marginal portions of said valve having sectional outlines substantially in the form of isosceles triangles the substantially equal legs of which are formed by the inner and outer curved surfaces of said substantially crescent shaped valve.

8. A substantially crescent shaped slide valve for an internal combustion engine having ports therein, said ports being symmetrically arranged on either side of the longitudinal axis of said valve and being closed at their outer edges by marginal portions of said valve having sectional outlines substantially in the form of isosceles triangles the substantially equal legs of which are formed by the inner and outer surfaces of said substantially crescent shaped valve.

9. In an internal combustion engine, a cylinder having a longitudinal recess in the inner wall thereof, the side walls of the recess diverging inwardly to the cylinder, said cylinder having a port near one end of the recess thereof, a substantially crescent shaped valve member adapted to slide longitudinally in said recess to open and close the port, a crank adapted to rotate near one end of said valve member, a bracket at one end of the valve member and adjustably secured thereto for regulating the setting of the valve, and a connecting rod for the crank pivotally connected to said bracket so as to reciprocate said substantially crescent shaped valve member.

10. In an internal combustion engine, a cylinder having a longitudinal recess in the inner wall thereof, the side walls of the recess diverging inwardly to the cylinder, said cylinder having a port near one end of the recess thereof, a substantially crescent shaped valve member adapted to slide longitudinally in said recess to open and close the port, a crank adapted to rotate near one end of said valve member, a bracket at the lower end of the valve member having a foot extending across the end thereof, said bracket being adjustable relative to the valve member for regulating the setting of the valve, and a connecting rod for the crank pivotally connected to said bracket so as to reciprocate said substantially crescent shaped valve member.

11. In an internal combustion engine, a cylinder having a longitudinal recess in the inner wall thereof, the side walls of the recess diverging inwardly to the cylinder, a substantially crescent shaped valve member adapted to slide longitudinally in said recesses, and mechanism operatively connected to the valve member to reciprocate the same, said cylinder having two longitudinally spaced inlet ports for gaseous fuel near one end of the recess therein, and said substantially crescent shaped valve member having corresponding longitudinally spaced ports for controlling the cylinder ports, the cylinder having a head formed with a downwardly curved wall opposite the upper port for directing the incoming gases downwardly so as to produce a turbulent movement of these gases.

12. A substantially crescent shaped slide valve for an internal combustion engine formed with two pairs of ports spaced longitudinally of the valve, the ports of each pair being disposed symmetrically on either side of the longitudinal axis of the valve.

In testimony whereof I affix my signature.

EDWARD O. SPILLMAN.